United States Patent [19]

Beckwith

[11] Patent Number: 5,003,773

[45] Date of Patent: Apr. 2, 1991

[54] BYPASS CONDUIT FOR GAS TURBINE ENGINE

[75] Inventor: Barry M. Beckwith, Coventry, Conn.

[73] Assignee: United Technologies Corporation, Hartford, Conn.

[21] Appl. No.: 370,503

[22] Filed: Jun. 23, 1989

[51] Int. Cl.⁵ .............................................. F02C 7/12
[52] U.S. Cl. .................................. 60/262; 60/39.75; 60/39.83; 415/116
[58] Field of Search ................. 60/262, 39.75, 39.83, 60/39.161; 415/115, 116, 175, 180

[56] References Cited

U.S. PATENT DOCUMENTS

| 2,630,673 | 3/1953 | Woll |
| 3,418,810 | 12/1968 | Cresswell et al. |
| 3,486,338 | 12/1969 | Haussmann et al. |
| 3,651,645 | 3/1972 | Grieb |
| 3,826,084 | 7/1974 | Branstrom et al. | 60/39.75 |
| 3,989,410 | 11/1976 | Ferrari | 415/116 |
| 4,023,731 | 5/1977 | Patterson | 415/116 |
| 4,466,239 | 8/1984 | Napoli et al. | 415/116 |
| 4,542,623 | 9/1985 | Hovan et al. | 415/180 |
| 4,653,267 | 3/1987 | Brodell et al. | 60/39.83 |
| 4,761,947 | 8/1988 | Hennecke et al. | 60/39.83 |
| 4,791,784 | 12/1988 | Minardi et al. |
| 4,815,272 | 3/1989 | Laurello | 60/39.75 |
| 4,849,895 | 7/1989 | Kervistin | 60/39.75 |

Primary Examiner—Donald E. Stout
Attorney, Agent, or Firm—Troxell K. Snyder

[57] ABSTRACT

A gas turbine engine (10) is provided with a bypass conduit (56) for venting air (52) leaking past a rotating compressor seal (46). The leakage air (58) is returned to the working fluid flow path (64) upstream of this first turbine stage (32).

4 Claims, 1 Drawing Sheet

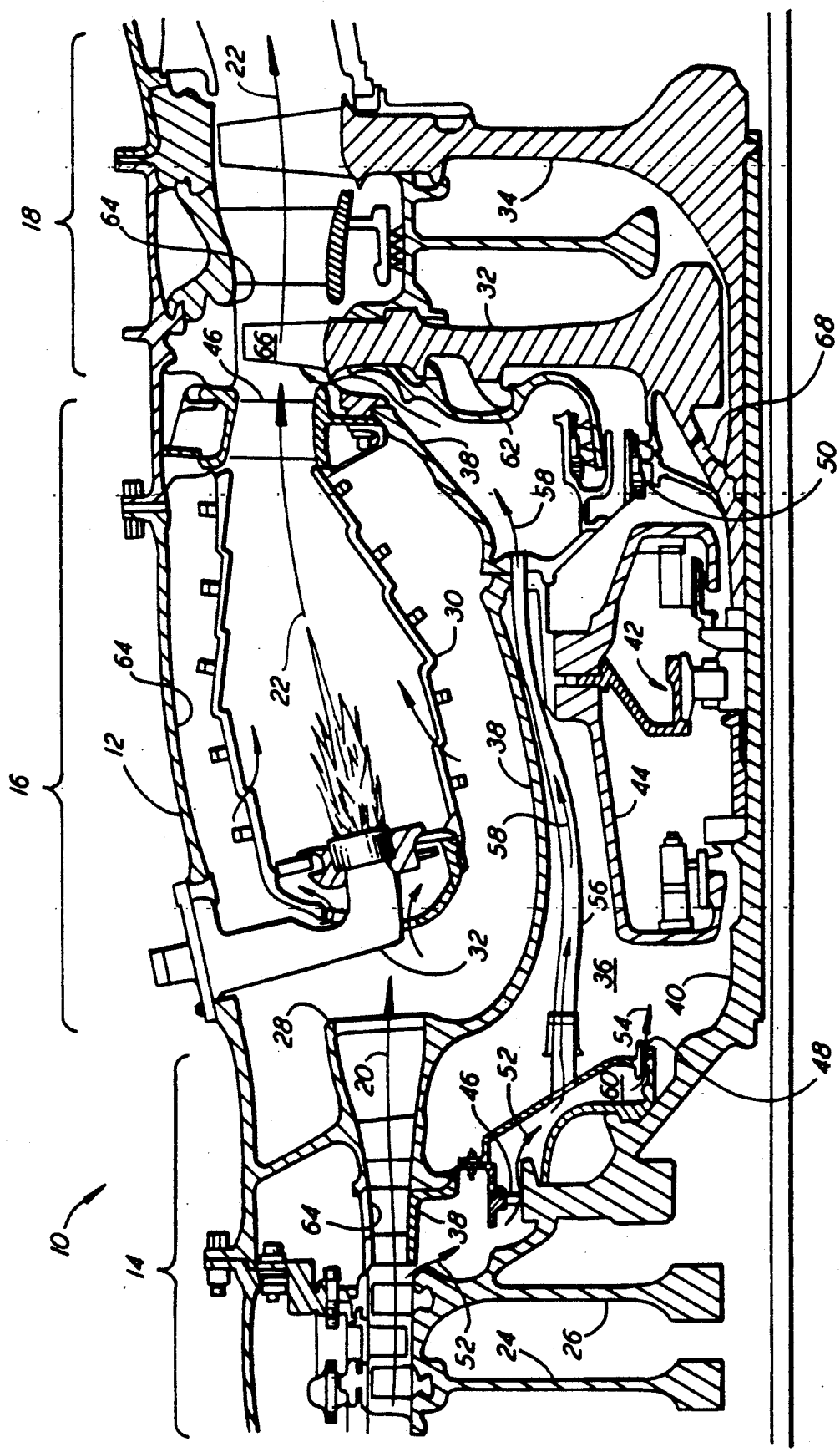

BYPASS CONDUIT FOR GAS TURBINE ENGINE

DESCRIPTION

1. Field of the Invention

The present invention relates to a system for managing leakage air flow in an axial flow gas turbine engine.

2. Background of the Invention

Leakage of the working fluid in a gas turbine engine past various internal rotating annular seals is well-known to designers of axial flow gas turbine engines. The working fluid, admitted to the compressor section as ambient air and raised to relatively high pressure by the compressor section, enters an annular combustor wherein fuel is mixed and burned to produce even higher temperature combustion products which then enter the engine turbine section wherein the energy in the working fluid is recovered in the form of mechanical shaft power. The combustor section in typical gas turbine engines is non-rotating, thus requiring some type of rotating seal between the last rotor stage of the upstream compressor section as well as another rotating seal assembly between the combustor section discharge and the first rotor stage of the gas turbine section.

The volume disposed radially inward of the annular combustor and axially between the last combustor stage and first turbine stage is typically maintained at a lower pressure relative to that of the working fluid turbine inlet, thereby creating the potential for leakage of compressor air past the rotating seal disposed between the last compressor stage and non-rotating section.

Axial flow gas turbine engines frequently locate one or more shaft bearing assemblies within the volume disposed inward of the annular combustor, and therefore require some form of cooling to protect the bearing structure from the high temperature working fluid flowing nearby. Such coolant may be provided by supplying a flow of cooling buffer air or the like to the volume adjacent the bearing structure, however, it has been found that the compressor seal leakage air flowing into the lower pressure bearing volume becomes heated by virtue of the high shear which occurs as the leakage air flows past the rotating compressor seal assembly. The compressor leakage air, heated even beyond the compressor discharge temperature, reduces the effectiveness of a given quantity of cooled buffer air supplied to the bearing volume thereby increasing the flow requirement of cooled buffer air to protect the bearing structure.

As will be appreciated by those skilled in the art, the increased quantity of pressurized air, also known as secondary air, used for cooling the gas turbine engine reduces engine efficiency. What is required is a means for reducing the quantity of buffer air required to protect the bearing volume in an axial flow gas turbine.

SUMMARY OF THE INVENTION

It is therefore an object of the present invention to provide an arrangement for an axial flow gas turbine engine which reduces the flow of leakage air into the annular bearing compartment.

According to the present invention, the volume defined radially inward of an annular combustor section in a gas turbine engine is maintained at a reduced pressure as compared to the annular flow stream of working fluid. The volume is sealed from the compressed air flow entering the combustor section from the upstream combustor section by two rotating seals disposed in series between the rotating final compressor stage and the non-rotating combustor inlet. The volume is sealed at the downstream end by a third rotating seal assembly located between the non-rotating combustor section outlet and the first rotating turbine stage.

Compressor discharge air leaking past the first rotating seal is collected in an annular seal compartment disposed between the two rotating compressor seals and vented aftward past the annular volume through a conduit. The conduit discharges the collected leakage air back into the working fluid flow upstream of the first turbine stage, thereby bypassing the lower pressure volume.

For gas turbine engines wherein the lower pressure volume houses at least one main engine shaft bearing, the bypass conduit according to the present invention avoids mingling of the compressor leakage air flow with the cool buffer air typically supplied to the volume for thermally protecting the bearing structure. By returning the collected leakage air to the working fluid flow upstream of the first turbine stage, the present invention permits recovery of the energy present in the compressed air. Additionally, by discharging leaking air into the working fluid flow through an annular gap between the non-rotating combustor discharge and the rotating first turbine stage, the bypass configuration according to the present invention provides additional cooling to the first turbine stage disk periphery.

Both these and other objects and advantages of the configuration according to the present invention will be apparent to those skilled in the art upon review of the following detailed specification and the appended claims and drawing figures.

BRIEF DESCRIPTION OF THE DRAWINGS

The Figure shows a half plane cross section of a portion of the high compressor, combustor and high turbine sections of a gas turbine engine including the bypass conduit according to the present invention.

DETAILED DESCRIPTION

Referring now to the Figure, a half plane partial cross section of an axial flow gas turbine engine is shown. The engine section 10 includes an outer engine case 12 surrounding a forward high compressor section 14, a combustor section 16 disposed immediately downstream of the compressor section 14, and a high turbine section 18 located immediately downstream of the combustor section 16.

The axial compressor section 14 is comprised of a plurality of rotating blade stages 24, 26 which deliver an annular stream of compressed air 20 to the inlet 28 of the combustor section 16. The compressed air 20 enters the combustion chamber 30 disposed within the combustor section 16, and is mixed with liquid fuel or the like delivered by the fuel nozzle 32. Combustion products 22 exit the combustion chamber 30, entering the turbine section 18 and passing sequentially over the first turbine stage 32 and second turbine stage 34 as shown.

The combustor section 16 is isolated radially from an inner annular volume 36 by an annular stationary divider 38 disposed between the combustion chamber 30 and the axial shaft 40 joining the compressor stages 24, 26 with the turbine stages 32, 34. In the engine 10 shown in the Figure, the annular volume 36 includes the high rotor shaft bearing assembly 42 which supports the high rotor shaft 40. Bearing assembly 42 as shown is exposed within a bearing housing 44 which is supplied with a flow of cooled buffer gas or air (not shown) for maintaining the bearing structure 42 at a temperature and pressure significantly lower than that present at the combustion section inlet 28 or outlet 46.

As will be appreciated by those skilled in the art, it is necessary to provide a rotating seal between the rotating portions of the engine 24, 26, 40, 32, 34, and the non-rotating static structure 38 associated with the combustor section 16 and engine case 12. For the compressor section 14, it is common to use two rotating seals 46, 48 disposed in series for isolating the compressor flow 20 from the inner low pressure volume 36. For the turbine section 18, a knife edge type seal 50 is typical as shown.

Despite these rotating seals, at least a portion 52 of the compressed air 20 passes from the working flow path and through the rotating seals 46, 48 to enter the inner volume 36. This leakage air 52 is significantly hotter than the cool buffer air supplied to the volume 36 for cooling the bearing structure 42, and when intermingled therewith raises the average gas temperature within the inner volume 36. Thus it is common in the prior art to provide additional buffer air to the bearing housing 44 to maintain the bearing structure 42 at a suitable temperature.

The present invention reduces or eliminates the quantity of second seal leakage 54 entering the inner volume 36 by providing a bypass conduit 56 which vents leakage air 52 from the annular seal volume 60 disposed between the rotating compressor seals 46, 48. The bypass flow 58 is conducted through the annular volume 36 via conduit 56 and is discharged upstream of the first turbine stage 32. The bypassed leakage air 58 flows radially outward over the upstream face 62 of the first turbine stage 32, entering the working fluid flow annulus 64 upstream of the first turbine stage blades 66. The energy present in the bypass leakage air 58 is thus recovered by the interaction with the rotating blades 66. Unlike prior art arrangements wherein the second seal leakage air 54 enters the annular volume 36, the conduit 56 according to the present invention returns the collected leakage air 58 to the working fluid stream instead of venting it to the second turbine stage 34 via vent holes 68.

Another feature of the bypass conduit 56 according to the present invention is the reduction in static gas pressure within the annular seal volume 60 which is achieved by venting the first seal leakage flow 52 directly to the turbine inlet. This reduction in static pressure within the volume 60 reduces the forward axial thrust on the compressor rotors 24, 26 and hence on the entire high spool 24, 26, 40, 32, 34, of the engine 10, thereby reducing the axial thrust which must be accommodated by the high spool thrust bearing (not shown). Although perhaps amounting to 3,000-4,000 pounds (21,000-27,600 kPa) of force, this is nonetheless significant when all of the balancing forces on the high rotor shaft 40 are taken into account.

The present invention is thus well suited for reducing the flow of cool buffer air required to protect the bearing structure 42 in the inner volume 36 thereby increasing overall engine efficiency by reducing the quantify of secondary cooling air.

I claim:

1. In a gas turbine engine having a rotating compressor section with a final rotating stage, an annular combustor section, and a turbine section all disposed sequentially about a single axis and further including a low pressure compartment disposed radially inward of the compressor section and sealingly isolated from an annular flow of pressurized working fluid passing axially through the engine by an upstream pair of rotating seals disposed in series between the working fluid flow exiting the last compressor stage and non-rotating combustor section inlet, and by a downstream rotating seal disposed between the non-rotating combustor section outlet and a first rotating turbine stage, the upstream pair of rotating seals defining an annular seal compartment therebetween, where the improvement comprises:

means for venting leakage working fluid from the annular seal compartment to a point in the annular working fluid flow stream prior to the first turbine stage.

2. The engine as recited in claim 1 wherein the venting means further includes
   · a conduit having a first end opening into the annular seal compartment and extending axially downstream through the low pressure compartment, the other end of the conduit opening adjacent the upstream face of the first turbine stage.

3. The engine as recited in claim 1 wherein a plurality of conduits extend axially through the low pressure volume for conducting the leakage working fluid therethrough.

4. The engine as recited in claim 2 wherein the conduit discharges the vented working fluid into an annular compartment defined by an inner annular divider wall of the combustor section, the upstream face of the first turbine stage and the downstream turbine rotating seal.

* * * * *